(12) United States Patent
Weismuller et al.

(10) Patent No.: US 9,305,233 B2
(45) Date of Patent: Apr. 5, 2016

(54) ISOTROPIC FEATURE MATCHING

(71) Applicant: The Boeing Company, Chicago, IL (US)

(72) Inventors: Thomas Paul Weismuller, Orange, CA (US); David Leonard Caballero, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 322 days.

(21) Appl. No.: 14/025,266

(22) Filed: Sep. 12, 2013

(65) Prior Publication Data

US 2015/0071489 A1    Mar. 12, 2015

(51) Int. Cl.
G06K 9/00 (2006.01)
G06K 9/32 (2006.01)
G06K 9/62 (2006.01)

(52) U.S. Cl.
CPC ............ G06K 9/3241 (2013.01); G06K 9/6211 (2013.01)

(58) Field of Classification Search
None
See application file for complete search history.

(56) References Cited

U.S. PATENT DOCUMENTS 6,807,286 B1 * 10/2004 Krumm et al. ................ 382/103
8,385,657 B2    2/2013 Basri et al.

FOREIGN PATENT DOCUMENTS

CN    102200999 A    9/2011

OTHER PUBLICATIONS

Bebis, "Edge Detection," Class notes: Trucco, Chapter 4, and Jain et al. Chapter 5, CS491E/791E: Computer Vision, Spring 2004, University of Nevada, Reno, Feb. 2003, 29 pages, accessed Sep. 12, 2013. http://www.cse.unr.edu/~bebis/CS791E/Notes/EdgeDetection.pdf.
Hel-Or, "Image Processing," Lesson 10, Semester A 2010-2011 Coursework, University of Haifa, Aug. 2010, 13 pages, last accessed Sep. 12, 2013. http://cs.haifa.ac.il/hagit/courses/ip/Lectures/lp11_edgex4.pdf (http://cs.haifa.ac.il/hagit/courses/ip/).
International Search Report and Written Opinion, dated Mar. 23, 2015, regarding Application No. PCT/US2014/042875, 13 pages.
Belongie et al., "Shape Matching and Object Recognition Using Shape Contexts," IEEE Transactions on Pattern Analysis and Machine Intelligence, vol. 24, No. 4, Apr. 2002, pp. 509-522.
Deng et al., "Reinforcement Matching Using Recognition Context," Proceedings of the 2006 Conference on Computer Vision and Pattern Recognition Workshop (CVPRW'06), Jun. 2006, 8 pages.

* cited by examiner

Primary Examiner — Atiba O Fitzpatrick
(74) Attorney, Agent, or Firm — Yee & Associates, P.C.

(57) ABSTRACT

A computer-implemented method and apparatus for detecting an object of interest. An edge image is generated from an image of a scene. A sectioned structure comprising a plurality of sections is generated for use in analyzing the edge image. The edge image is analyzed using the sectioned structure to detect a presence of the object of interest in the edge image.

19 Claims, 7 Drawing Sheets

ISOTROPIC FEATURE MATCHING

BACKGROUND INFORMATION

1. Field

The present disclosure relates generally to identifying objects in images and, in particular, to identifying objects in images by detecting features representing the objects in the images. Still more particularly, the present disclosure relates to a method and apparatus for performing isotropic feature detection using sectioned structures to identify objects of interest in images.

2. Background

Object detection is the detection of objects of interest in images and/or video. An object of interest may be, for example, a building, a landscape element, a terrain element, an aerial vehicle, a ground vehicle, a missile, a spacecraft, or some other type of object. In this manner, an object of interest may be a natural or manmade object of interest.

Object detection is a fundamental part of performing many different types of operations. For example, object detection may be used when performing surveillance operations, target tracking operations, target acquisition operations, target identification operations, and/or other types of operations.

Object detection oftentimes includes performing feature detection. Feature detection is the detection of features of interest within an image. As used herein, a "feature," may be some type of discernible element or structure within an image. For example, a feature may be a point, an edge, or a shape in an image that represents an object or some portion of an object.

In one illustrative example, an optical tracking system may be used to generate images of a target object. Feature detection may be used to identify the target object in the generated images based on the detection of features that represent the target object in the generated images. In this example, the ability to process images and detect features of interest quickly and efficiently may be crucial. Consequently, a method for feature detection that is not computationally intensive or time-consuming may be desired.

Feature detection oftentimes includes edge detection. Edge detection is the detection of features in the form of edges. Oftentimes, with edge detection, an image, such as a camera image, is converted into a binary image in which pixels having one value represent a background and pixels having a another value represent edges. These binary images are also referred to as edge images. Pattern matching is then used to match the characteristics of the edges in an edge image with known patterns of edges for certain objects of interest.

Using edge imagery may be beneficial because edge imagery may be relatively insensitive to changes in lighting. For example, the edges of an object may appear the same in an edge image whether the object of interest is brighter or darker than the background in the scene as long as the object of interest has distinctive edges.

However, with some currently available methods of edge detection and pattern matching, analyzing images of a scene may take more time than desired for real-time applications. When using edge images, a pixel-by-pixel search may need to be made for locations in the image corresponding to a best-fit for an object of interest. The fit may be made by matching a template of an edge pattern that represents the object of interest to a portion of the edges in an edge image. This template may be referred to as an edge pattern template or in some cases, a wireframe template.

Further, rotational adjustments may need to be made to take into account the different possible orientations of a scene relative to the imaging system generating the images of the scene. Still further, the range of a scene with respect to an imaging system may affect the positions, shapes, and/or sizes of edges that are detected. For example, the edges detected for images of terrain taken at higher elevations may be fewer than the edges detected for images taken at lower elevations.

Creating an edge pattern template that accounts for different ranges may be more difficult than desired. Using a single edge pattern template for edge images corresponding to different ranges may reduce the overall accuracy with which objects of interest are detected and located. Therefore, it would be desirable to have a method and apparatus that take into account at least some of the issues discussed above, as well as other possible issues.

SUMMARY

In one illustrative embodiment, a method is provided for detecting an object of interest. An edge image is generated from an image of a scene. A sectioned structure comprising a plurality of sections is generated for use in analyzing the edge image. The edge image is analyzed using the sectioned structure to detect a presence of the object of interest in the edge image.

In another illustrative embodiment, a system comprises a feature detector and a feature analyzer. The feature detector is configured to generate an edge image from an image of a scene. The feature analyzer is configured to generate a sectioned structure comprising a plurality of sections and to analyze the edge image using the sectioned structure to detect a presence of the object of interest in the edge image.

In yet another illustrative embodiment, a non-transitory computer readable storage medium stores program code which, when executed by a computer, performs a method on one or more hardware components. The program code comprises program code configured to store a set of reference images in which each reference image in the set of reference images contains an edge pattern representing an object of interest at a particular range. The program code further comprises program code configured to generate an edge image from an image of a scene generated at a selected range. Still further, the program code comprises program code configured to form a sectioned structure comprising a plurality of sections and to determine whether the object of interest is represented in the edge image by analyzing the edge image using the sectioned structure and a reference image from the set of reference images corresponding to the selected range.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that using edge imagery to detect and locate features of interest in images may become increasingly limited as the number of pixels in the images increases. For example, an edge pattern template may be 100 pixels by 100 pixels. However, the edge image to be analyzed using the edge pattern template may be 640 pixels by 480 pixels. When no rotational adjustments are made, about 2 billion pixel-by-pixel comparisons may need to be processed. When rotational adjustments do need to be made, the number of comparisons needed may increase to over 730 billion comparisons for one degree of accuracy.

Consequently, the different illustrative examples recognize and take into account that it may be desirable to have a method and apparatus for detecting objects of interest that do not need to perform additional rotational adjustments. In other words, it may be desirable to have a method and apparatus for isotropically detecting objects of interest.

Figure 1:
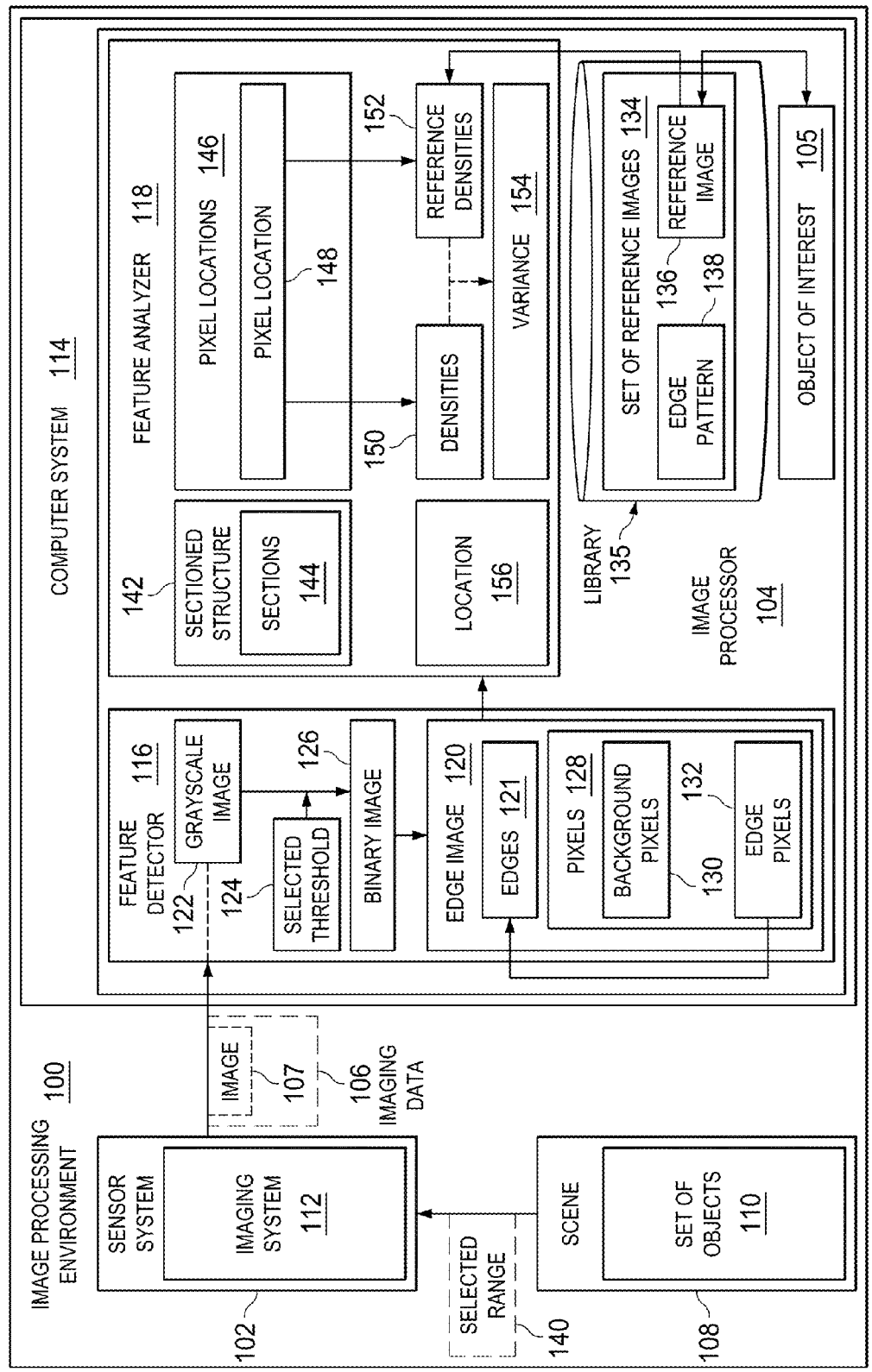
FIG. 1 is an illustration of an image processing environment in the form of a block diagram in accordance with an illustrative embodiment.

Referring now to the figures and, in particular, with reference to FIG. 1, an illustration of an image processing environment is depicted in the form of a block diagram in accordance with an illustrative embodiment. In this illustrative example, the image processing environment 100 may include a sensor system 102 and an image processor 104.

The sensor system 102 may be used to generate imaging data 106 for a scene 108. Depending on the implementation, the imaging data 106 may include, for example, without limitation, an image 107 of the scene 108, an electronic data file associated with an image 107 of the scene 108, data that may be used to form an image 107 of the scene 108, and/or other types of data.

In this illustrative example, the imaging data 106 may include an image 107 of the scene 108. Although only one image 107 is described as being generated, the sensor system 102 may be used to generate any number of images. For example, the sensor system 102 may be used to generate a sequence of images in the form of a video. A sequence of images may include two or more images ordered with respect to time.

The scene 108 captured in the image 107 may include a set of objects 110. As used herein, a "set of" items may include one or more items. In this manner, the set of objects 110 may include one or more objects. As used herein, an "object" may be any type of natural or manmade object. For example, an object in the set of objects 110 may take the form of a building, an aircraft, a ground vehicle, a terrain feature, a landscape feature, a mountain ridge, a group of mountain ridges, a crater, or some other type of object or combination thereof.

In one illustrative example, the sensor system 102 takes the form of an imaging system 112. The imaging system 112 may be implemented using, for example, without limitation, a camera, an electro-optical imaging system, a radar imaging system, an infrared imaging system, a laser imaging system, or some other type of imaging system configured for generating imaging data 106.

In this illustrative example, the image processor 104 is configured to receive and process the imaging data 106 generated by the sensor system 102. In particular, the image processor 104 is used to detect the presence of an object of interest 105 in the set of objects 110 in the scene 108 based on the imaging data 106 generated for the scene 108.

The image processor 104 may be implemented using hardware, software, firmware, or a combination thereof. When software is used, the operations performed by the image processor 104 may be implemented using program code configured to run on a processor unit. The program code may be stored in a non-transitory computer readable storage medium. When firmware is used, the operations performed by the image processor 104 may be implemented using, for example, without limitation, program code and data stored in persistent memory configured to run on a processor unit.

When hardware is employed, the hardware may include one or more circuits that operate to perform the operations performed by the image processor 104. Depending on the implementation, the hardware may take the form of a circuit system, a microchip, an integrated circuit, an application specific integrated circuit (ASIC), a programmable logic device, or some other suitable type of hardware device configured to perform any number of operations. In some cases, the operations performed by the image processor 104 may be implemented using a processor unit. Depending on the implementations, the operations performed by the image processor 104 may be performed by a group of processor units.

In one illustrative example, the image processor 104 may be implemented using a computer system 114 comprised of one or more computers. When more than one computer is present in the computer system 114, these computers may be in communication with each other. When more than one computer is present in the computer system 114, the different operations performed by the image processor 104 may be distributed across these computers.

When the imaging data 106 includes an electronic data file associated with the image 107 of the scene 108 or other data that may be used to generate the image 107 of the scene 108, the image processor 104 may process the imaging data 106 to form the image 107 of the scene 108. The image 107 of the scene 108 may then be used to detect the presence of the object of interest 105 in the scene 108.

As depicted, the image processor 104 may include a feature detector 116 and a feature analyzer 118. In one illustrative example, the image processor 104 may take the form of, for example, without limitation, a processor or microprocessor having encoded instructions therein that are executable to function as a feature detector 116, and further instructions that are executable to function as a feature analyzer 118.

The feature detector 116 is used to detect features within the image 107. The feature analyzer 118 is used to analyze the features detected within the image 107. The feature detector 116 may be used to detect features such as, for example, without limitation, points, edges, and/or objects in the image 107.

In this illustrative example, the feature detector 116 may be used to detect edges within the image 107. In this manner, the feature detector 116 may be referred to as an edge detector that performs edge detection. Edge detection may be the detection of features in the form of edges in an image. In edge detection, an image, such as the image 107 of the scene 108, is converted into an edge image. An edge image may be a binary image in which pixels having one value represent a background and pixels having another contrasting or differing value represent edges.

Using edge imagery may be beneficial because edge imagery may be relatively insensitive to changes in lighting. For example, the edges of an object may appear the same in an edge image whether the object is brighter or darker than the background in the scene as long as the object in the edge image has distinctive edges.

In this illustrative example, the feature detector 116 may process the image 107 to form an edge image 120 having edges 121. The edge image 120 may be formed in a number of different ways using any number of edge detection algorithms and/or image processing techniques.

In one illustrative example, the feature detector 116 first forms a grayscale image 122 from the image 107. Next, each pixel in the grayscale image 122 is compared against a selected threshold 124 for determining which pixels contrast in brightness relative to other adjacent pixels, e.g., where brightness changes sharply, to form the edge image 120. In particular, each pixel in the grayscale image 122 having a pixel value equal to or greater than a selected threshold 124 may be set to a first pixel value. The first pixel value may be, for example, a white value. Further, each pixel in the grayscale image 122 having a pixel value lower than the selected threshold 124 may be set to a second pixel value. The second pixel value may be, for example, a black value. In this manner, the grayscale image 122 may be thresholded to form a binary image 126 in which each pixel in the binary image 126 has only one of two possible pixel values.

Depending on the implementation, the binary image 126 may be further processed using one or more edge detection techniques and/or filters to form the edge image 120. In other illustrative examples, the grayscale image 122 may be processed using an edge detection algorithm prior to being thresholded. In these examples, the binary image 126 formed may be the edge image 120.

The edge image 120 may include a plurality of pixels 128. A first portion of the pixels 128 in the edge image 120 may be background pixels 130. A second portion of the pixels 128 in the edge image 120 may be edge pixels 132. Each of the background pixels 130 may have a first pixel value and each of the edge pixels 132 may have a second pixel value that is different from the first pixel value. The edge pixels 132 form the edges 121 in the edge image 120.

In this illustrative example, the edge image 120 is then sent to the feature analyzer 118 for processing. The feature analyzer 118 identifies the selected range 140 corresponding to the image 107. The selected range 140 is the distance between the scene 108 and the sensor system 102 at the time that the sensor system 102 generated the imaging data 106 for the scene 108.

The feature analyzer 118 may then use pattern matching to match the characteristics of the edges 121 in the edge image 120 with a known pattern of edges for the objects of interest 105. A pixel-by-pixel search is made for locations in the edge image 120 corresponding to a best-fit for the object of interest 105. The fit is preferably made by matching a known edge pattern that represents the object of interest 105 to a portion of the edges 121 in the edge image 120. In some cases, this known edge pattern may be referred to as an edge pattern template or a wireframe template.

Creating an edge pattern template that accounts for different ranges may be more difficult than desired. Using a single edge pattern template for edge images corresponding to different ranges relative to the ground may reduce the overall accuracy with which objects of interest are detected and located in the edge image. Consequently, the feature analyzer 118 may need to match the characteristics of the edges 121 in the edge image 120 with an edge pattern 138 for the object of interest 105 that corresponds to the selected range 140. The edge pattern 138 corresponding to the selected range 140 may be a pattern of edges that represent the object of interest 105 at the selected range 140 corresponding to the image 107 from which the edge image 120 was created. Matching the edge pattern 138 to the characteristics of the edges 121 in the edge image 120 may be referred to as detecting the presence of the edge pattern 138 in the edge image 120.

In this illustrative example, the feature analyzer 118 may use a set of reference images 134 stored in a library 135 to detect the presence of the edge pattern 138 corresponding to the selected range 140 in the edge image 120. The library 135 may be implemented using, for example, without limitation, a database, a data structure, or some other type of data storage configured to store the set of reference images 134. Each reference image in the set of reference images 134 may contain an edge pattern representing the object of interest 105 at a particular range. In this illustrative example, a particular reference image 136 may contain the edge pattern 138 that represents the object of interest 105 at the selected range 140.

In particular, the reference image 136 may be an edge image generated from an image of the object of interest 105 taken by a sensor system at the selected range 140 relative to the object of interest 105. This sensor system may or may not be the same as the sensor system 102 used to generate the original image 107, but may be of the same type. Each of the set of reference images 134 may be a reference edge image corresponding to a particular range.

The feature analyzer 118 then generates a sectioned structure 142 for use in analyzing the edge image 120. The sectioned structure 142 may be scaled in size based on the selected range 140. As depicted, the sectioned structure 142 may be comprised of a plurality of sections 144. In one illustrative example, the sectioned structure 142 is a series of concentric circles, or rings. The sections 144 may include the bands and the center area formed by this series of concentric rings. In this manner, the sectioned structure 142 may be a concentric structure in which the plurality of sections 144 are concentric sections that share a same center axis.

The feature analyzer 118 may position the sectioned structure 142 over the edge image 120 to analyze the edge image 120. In particular, the feature analyzer 118 may center the sectioned structure 142 over each of a plurality of pixel locations 146 in the edge image 120. These pixel locations 146 may include at least a portion of the possible pixel locations in the edge image 120. Each of the pixel locations 146 may be selected such that the sectioned structure 142 fully overlaps the edge image 120. In other words, the pixel locations 146 may be selected such that the sectioned structure 142 is fully contained within the boundaries of the edge image 120 at each of the pixel locations 146.

At each pixel location 148, the feature analyzer 118 identifies a plurality of densities 150. In particular, at each pixel location 148, the feature analyzer 118 counts the number of the edge pixels 132 within each of the sections 144 and divides this number by the total number of pixels within that section to generate a density.

In some cases, the densities 150 identified for the sections 144 may be normalized to form a plurality of normalized densities. For example, the densities 150 identified for the sections 144 at a particular pixel location 148 may be normalized to one.

The sectioned structure 142 is generated such that the orientation of the sensor system 102 relative to the scene 108 within some selected range of possible orientations does not need to be taken into account. In other words, the densities 150 identified at a particular pixel location 148 may represent a density of edges for that pixel location 148 that is independent of the angle of rotation of the sensor system 102 relative to the scene 108. In this manner, the calculation of the densities 150 for the pixel location 148 may be performed isotropically.

The densities 150 identified are then compared to a plurality of reference densities 152 for the reference image 136 containing the edge pattern 138 corresponding to the selected range 140. The reference densities 152 may have been identified by analyzing the reference image 136 using a sectioned structure, similar to the sectioned structure 142 used by the feature analyzer 118 for analyzing the edge image 120.

The feature analyzer 118 compares the densities 150 to the reference densities 152 to identify an overall variance 154 for the pixel location 148. The overall variance 154 may be an indicator of how closely the densities 150 match the reference densities 152. The lower the variance, the more closely that the densities 150 match the reference densities 152.

The process described above may be repeated for each of the pixel locations 146 in order to generate a plurality of variances for the pixel locations 146. The feature analyzer 118 may identify the pixel location in the edge image 120 having the minimum variance that is also below a selected threshold as the location 156 of the edge pattern 138 in the edge image 120. If no pixel locations have a variance that is below the selected threshold, then the edge pattern 138 is considered not detected, or present, within the edge image 120.

In this manner, the edge pattern 138 may be detected and located using the sectioned structure 142. The sectioned structure 142 may be used without requiring any further adjustments to take into account different possible orientations of the sensor system 102 relative to the scene 108. In other words, the sectioned structure 142 may be used to perform isotropic edge detection.

The location 156 of the edge pattern 138 is the location at which the edges 121 in the edge image 120 best-fit the edge pattern 138 representing the object of interest 105. The location 156 identified is also the same pixel location for the object of interest 105 in the image 107 of the scene 108 identified from the imaging data 106 generated by the sensor system 102. When the edge pattern 138 is not detected in the edge image 120, the object of interest 105 is considered not detected.

In this manner, a determination as to whether the object of interest 105 is represented by a portion of the edges 121 in the edge image 120 may be made by analyzing the edge image 120 using the reference image 136 corresponding to the selected range 140 and the sectioned structure 142. Detecting a representation of the object of interest 105 within the edge image 120 based on identifying the edge pattern 138 contained in the reference image 136 as being present within the edge image 120 may be equivalent to a detection of the object of interest 105 in the image 107 of the scene 108.

This type of processing may be used to detect and track objects of interest in images quickly and efficiently for real-time and/or near real-time applications. The image processor 104 allows features to be detected and analyzed in images without having to make rotational adjustments to account for variations in the orientation of a sensor system relative to a scene. In this manner, the amount of time needed to process a single image may be significantly reduced.

In particular, using the sectioned structure 142 may reduce the amount of processing resources used by the image processor 104 when detecting the object of interest 105. These processing resources may include, for example, without limitation, the time, processing power, memory, and/or other types of resources needed to process images to detect the presence of objects of interest within these images.

The illustration of the image processing environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some illustrative examples, the set of reference images 134 may not include a reference image 136 containing the edge pattern 138 corresponding to the selected range 140. In these cases, the feature analyzer 118 may be configured to select a first reference image from the set of reference images 134 corresponding to a range just below the selected range 140 and a second reference image from the set of reference images 134 corresponding to a range just above the selected range 140.

The feature analyzer 118 may use an estimation technique to identify the reference densities 152 with which the densities 150 will be compared. For example, without limitation, the feature analyzer 118 may use the first reference image selected, the second reference image selected, and at least one of a polynomial curve fitting technique, an interpolation technique, or some other type of technique to identify the reference densities 152.

In this manner, the feature analyzer 118 may be able to evaluate edge images for various ranges, including those for which reference images are not included in the set of reference images 134. In other words, the feature analyzer 118 may be able to evaluate edge images over a continuum of ranges and not just a discrete set of ranges.

Further, although the feature detector 116 has been described as generating edge images to detect edges, the feature detector 116 may be configured to detect other types of features. Further, the feature analyzer 118 may be configured to analyze these other types of features.

Figure 2:
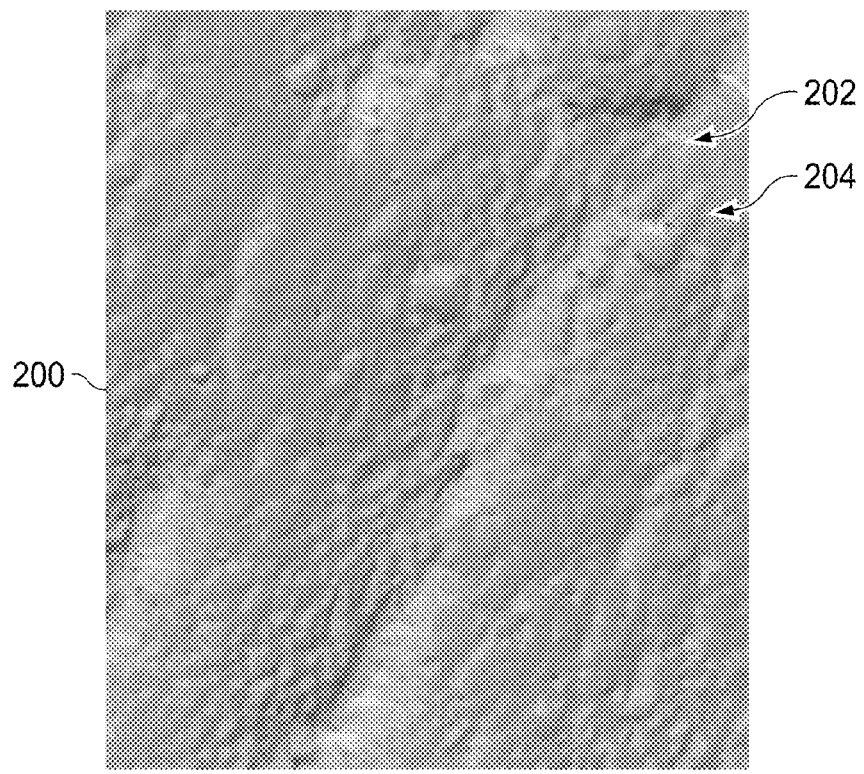
FIG. 2 is an illustration of an image in accordance with an illustrative embodiment.

With reference now to FIG. 2, an illustration of an image is depicted in accordance with an illustrative embodiment. In this illustrative example, the image 200 is an example of one implementation for the image 107 in FIG. 1. The image 200 may have been generated by, for example, a radar imaging system.

In this illustrative example, the scene captured by the image 200 is of a portion of the terrain on the planet Mars. As depicted, the image 200 may include a background 202 of Mars and terrain elements 204 located on Mars.

Figure 3:
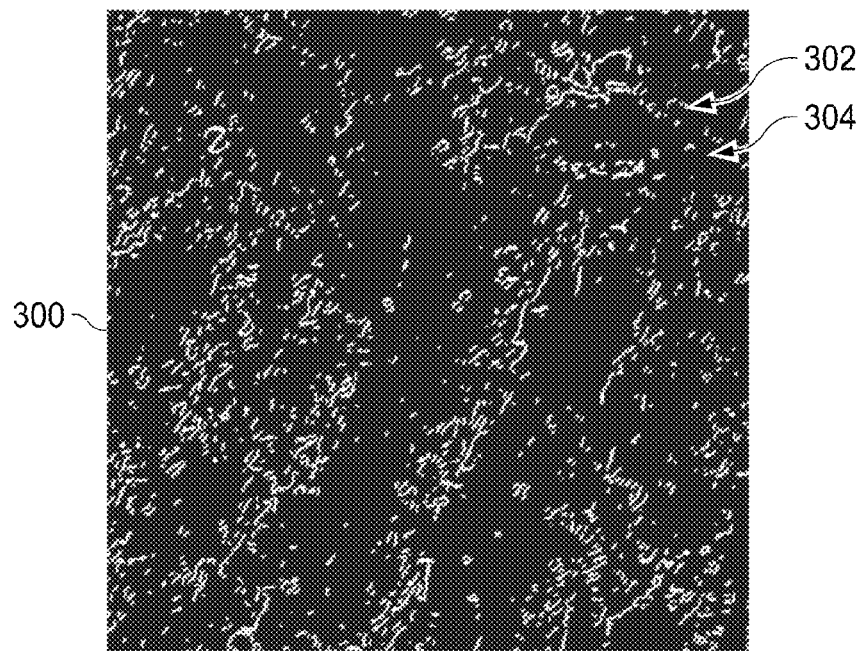
FIG. 3 is an illustration of an edge image in accordance with an illustrative embodiment.

Turning now to FIG. 3, an illustration of an edge image is depicted in accordance with an illustrative embodiment. In this illustrative example, the edge image 300 is an example of one implementation for the edge image 120 in FIG. 1. The edge image 300 is formed based on the image 200 in FIG. 2.

As depicted, the edge image 300 includes background pixels 302 and edge pixels 304. The edge pixels 304 represent the edges of the terrain elements 204 depicted in FIG. 2. These edges may be detected using any number of edge detection methods and/or techniques.

For example, generating the edge image 300 may include using an edge detection algorithm. The edge detection algorithm used may include at least one of, for example, without limitation, the Sobel edge detection filter, the Boie-Cox feature detector, the Canny edge detection method, or some other type of edge detection method.

Figure 4:
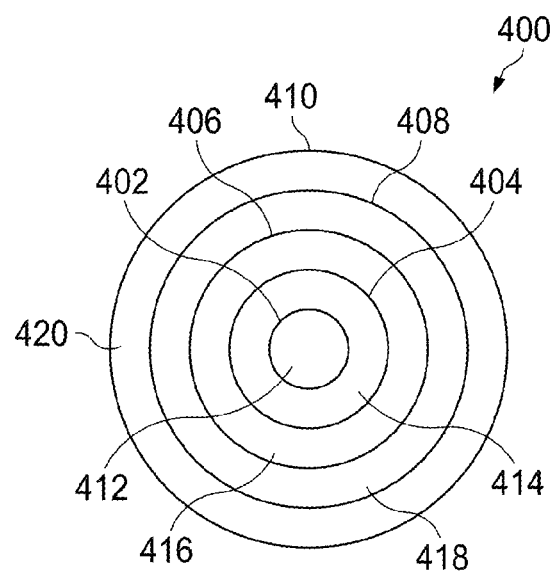
FIG. 4 is an illustration of a sectioned structure in accordance with an illustrative embodiment.

With reference now to FIG. 4, an illustration of a sectioned structure is depicted in accordance with an illustrative embodiment. The sectioned structure 400 in FIG. 4 is an example of one implementation for the sectioned structure 142 in FIG. 1. The sectioned structure 400 may be used to analyze the edge image 300 in FIG. 3 to determine whether an object of interest is present within the edge image 300 and to locate the object of interest in the edge image 300.

As depicted, the sectioned structure 400 is a series of concentric circles. In particular, the sectioned structure 400 may comprise circles 402, 404, 406, 408, and 410 that are concentric with respect to each other. These circles form sections 412, 414, 416, 418, and 420. Section 412 may be the center portion of the sectioned structure 400. Because the sectioned structure 400 is a series of concentric circles, processing of the edge image 300 may take into account all 360 degrees of possible orientations of the sensor system that generated the image 200 in FIG. 2 relative to the scene captured in the image 200.

The size of the circles 402, 404, 406, 408, and 410, and therefore the size of the sectioned structure 400, may be scaled based on the edge image 300 from FIG. 3 and the range at which the image 200 from FIG. 2 was generated. This range may be the altitude at which the image 200 in FIG. 2 was generated.

Figure 5:
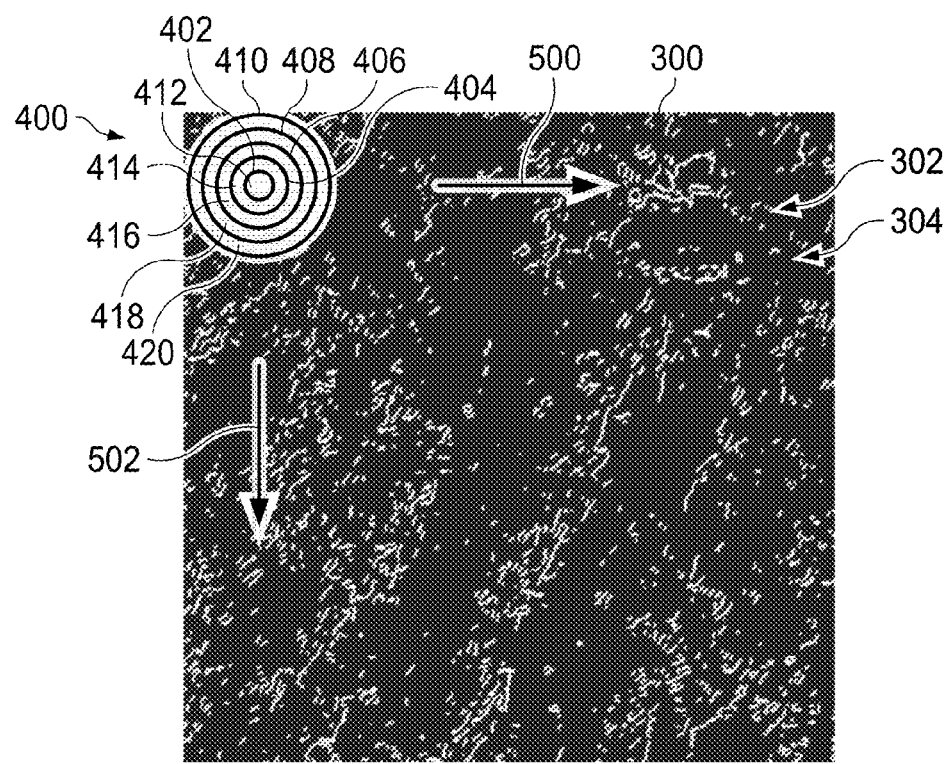
FIG. 5 is an illustration of a sectioned structure being used to analyze an edge image in accordance with an illustrative embodiment.

With reference now to FIG. 5, an illustration of a sectioned structure being used to analyze an edge image is depicted in accordance with an illustrative embodiment. In this illustrative example, the sectioned structure 400 from FIG. 4 is used to analyze the edge image 300 from FIG. 3. In particular, the sectioned structure 400 is used to determine whether an object of interest is present in the edge image 300 and to locate that object of interest if it is present.

As depicted, the sectioned structure 400 may be moved to various pixel locations over the edge image 300. In one illustrative example, the sectioned structure 400 may be moved over the edge image 300 in a manner similar to a raster pattern. For example, the sectioned structure 400 may be moved over the edge image 300 in the direction of arrow 500 and in the direction of arrow 502.

At each pixel location in the edge image 300 over which the sectioned structure 400 is centered, the number of pixels having a white value are divided by the number of pixels having a black value for each section in the sectioned structure 400 to form a density for each section. This density may be normalized to one in some cases to form a normalized density. The normalized densities for the different sections of the sectioned structure 400 may be compared against reference densities identified for a reference image containing an edge pattern that represents the object of interest to generate a variance for the pixel location. This process may be repeated for each pixel location in the edge image 300 over which the sectioned structure 400 is centered. All of the generated variances are compared. The pixel location having the minimum variance that is also below a selected threshold is identified as the location of the best-fit for the edge pattern and thereby, the location of the object of interest.

In some illustrative examples, once the location of the best-fit for the edge pattern and thereby, the object of interest, has been identified, the image processor may be configured to provide an output indicating that the object of interest has been detected. The output may take the form of, for example, without limitation, a visual alert, an audible alert, a message, a flashing graphical indicator, a print out, or some other type of output. This output may be used to communicate the detection of an object of interest for use in performing various operations including, but not limited to, activating an alarm, acquiring the location of a weapons target, tracking the weapons target, performing surveillance, and/or other types of operations.

Figure 6:
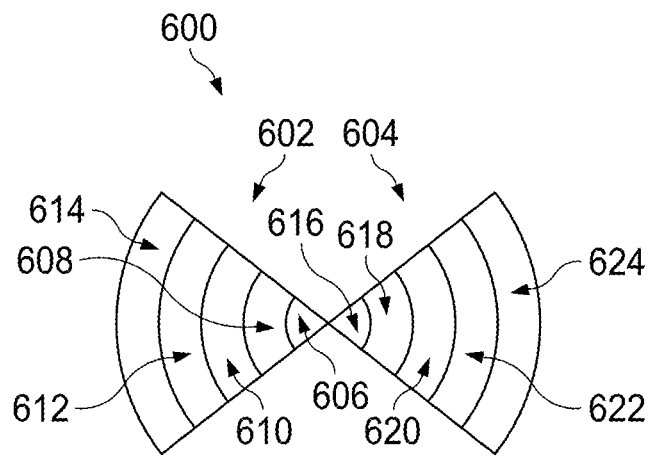
FIG. 6 is an illustration of another sectioned structure in accordance with an illustrative embodiment.

With reference now to FIG. 6, an illustration of another sectioned structure is depicted in accordance with an illustrative embodiment. The sectioned structure 600 may be another example of an implementation for the sectioned structure 142 in FIG. 1. The sectioned structure 600 may have a plurality of sections that are split into a first portion 602 and a second portion 604. As depicted, the first portion 602 and the second portion 604 may be a first sectioned wedge and a second sectioned wedge, respectively. In this manner, the sectioned structure 600 may be a multi-wedge structure.

As depicted, the first portion 602 of the sectioned structure 600 includes sections 606, 608, 610, 612, and 614, which may be a first portion of the plurality of sections of the sectioned structure 600. The second portion 604 of the sectioned structure 600 includes sections 616, 618, 620, 622, and 624, which may be a second portion of the plurality of sections of the sectioned structure 600.

The sections of the first portion 602 and the sections of the second portion 604 of the sectioned structure 600 may all be concentric in that they share the same center axis. In this manner, a sectioned structure that takes the form of a multi-wedge structure may still be a concentric structure. Using sectioned wedges, as compared to a series of concentric circles, may reduce processing time. In particular, using sectioned wedges may reduce the areas within which densities are to be calculated and thus, may speed up processing time.

Figure 7:
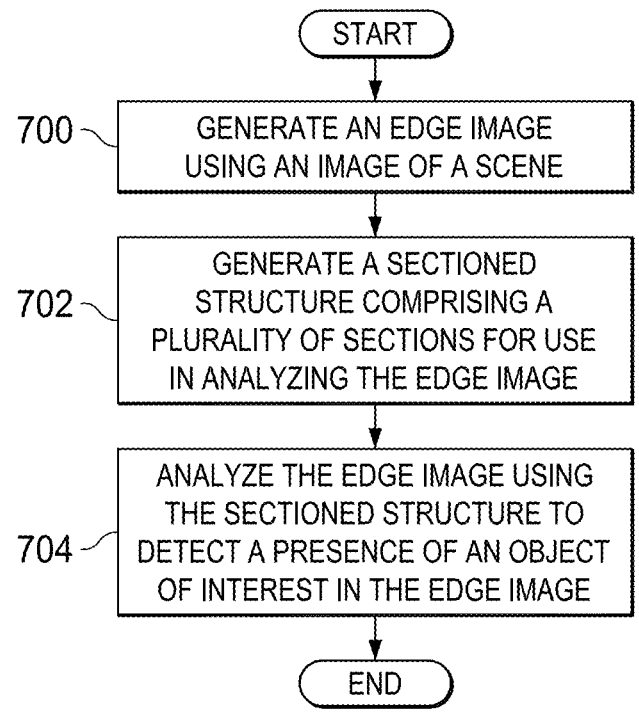
FIG. 7 is an illustration of a process for detecting an object of interest in an image in the form of a flowchart in accordance with an illustrative embodiment.

With reference now to FIG. 7, an illustration of a process for detecting an object of interest in an image in the form of a flowchart is depicted in accordance with an illustrative embodiment. The process illustrated in FIG. 7 may be implemented using the image processor 104 described in FIG. 1.

The process begins by generating an edge image from an image of a scene (operation 700). Next, a sectioned structure comprising a plurality of sections is generated for use in analyzing the edge image (operation 702). Thereafter, the edge image is analyzed using the sectioned structure to detect a presence of an object of interest in the edge image (operation 704), with the process terminating thereafter.

Figure 8:
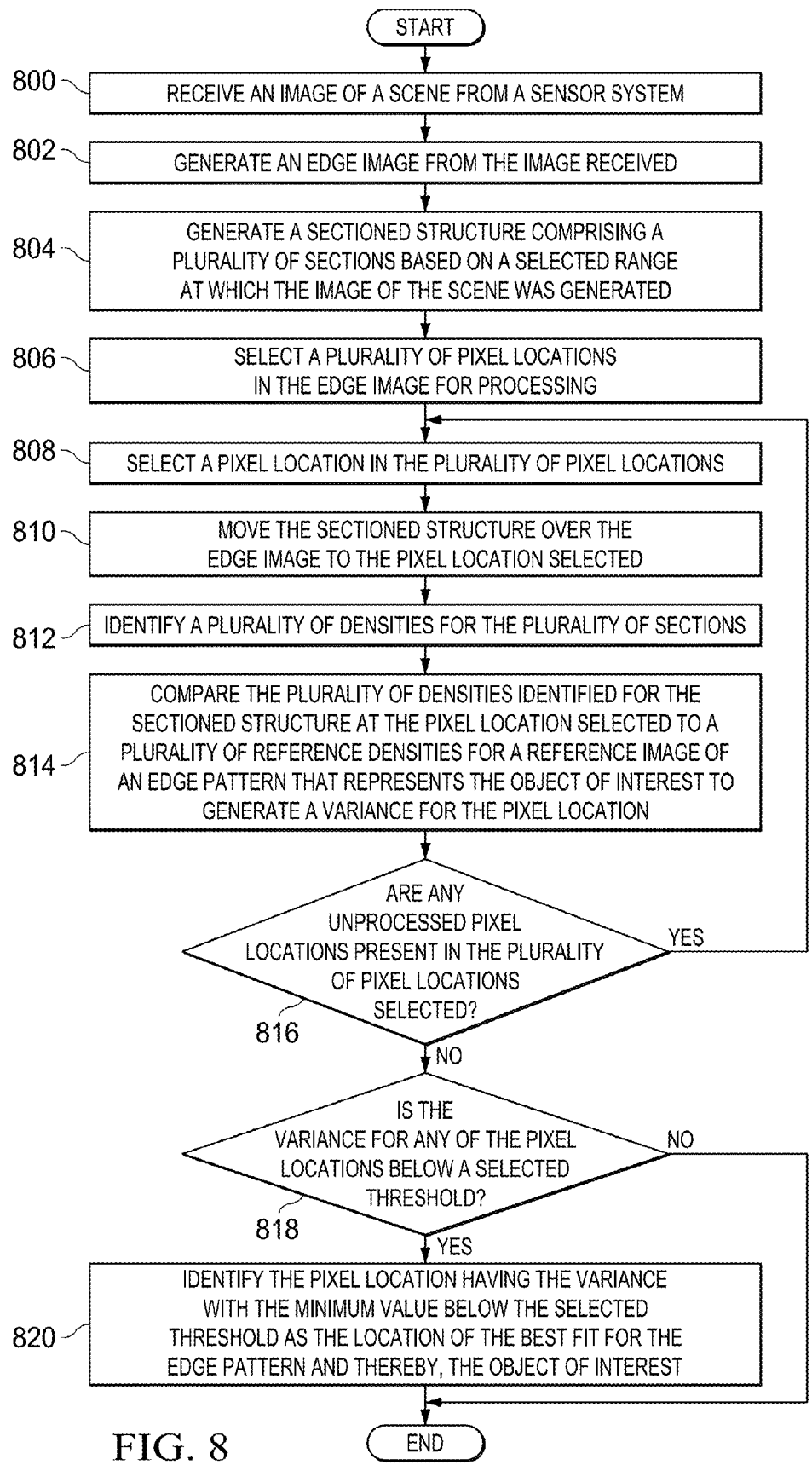
FIG. 8 is an illustration of a process for detecting and locating an object of interest in an image in the form of a flowchart in accordance with an illustrative embodiment.

With reference now to FIG. 8, an illustration of a process for detecting and locating an object of interest in an image in the form of a flowchart is depicted in accordance with an illustrative embodiment. The process illustrated in FIG. 8 may be implemented using the image processor 104 described in FIG. 1.

The process begins by receiving an image of a scene from a sensor system (operation 800). Next, an edge image is generated from the image received (operation 802). A sectioned structure comprising a plurality of sections is generated based on a selected range at which the image of the scene was generated (operation 804).

Thereafter, a plurality of pixel locations in the edge image may be selected for processing (operation 806). A pixel location in the plurality of pixel locations is selected (operation 808). Each pixel location in the plurality of pixel locations selected may be a pixel location at which the sectioned structure will fully overlap the edge image when centered at the pixel location.

Next, the sectioned structure is moved over the edge image to the pixel location selected (operation 810). A plurality of densities are identified for the plurality of sections (operation 812). In operation 812, a density for a section of the sectioned structure is identified by dividing the number of edge pixels overlapped by the section by the total number of pixels overlapped by the section. In some cases, the plurality of densities may be normalized densities that have normalized to, for example, one.

Thereafter, the plurality of densities identified for the sectioned structure at the pixel location selected are compared to a plurality of reference densities for a reference image of an edge pattern that represents the object of interest to generate a variance for the pixel location (operation 814). A determination is then made as to whether any unprocessed pixel locations are present in the plurality of pixel locations selected (operation 816).

If any unprocessed pixel locations are present, the process returns to operation 808 as described above. Otherwise, the process determines whether the variance for any of the pixel locations is below a selected threshold (operation 818). If no variance for a pixel location is below the selected threshold, the process terminates because the object of interest has not been detected.

Otherwise, if the variance for any of the pixel locations is below the selected threshold, the pixel location having the variance with the minimum value below the selected threshold is identified as the location of the best-fit for the edge pattern and thereby, the object of interest (operation 820). In other words, in operation 820, the object of interest is both detected and located in the edge image.

The process described in FIG. 8 may be used to detect and locate objects of interest in images quickly and efficiently. The object detection and location method described in FIG. 8 may be applied to real-time applications. For example, images generated by an imaging system may be processed in substantially real-time such that an object of interest may be detected, located, and tracked in the images in substantially real-time.

Figure 9:
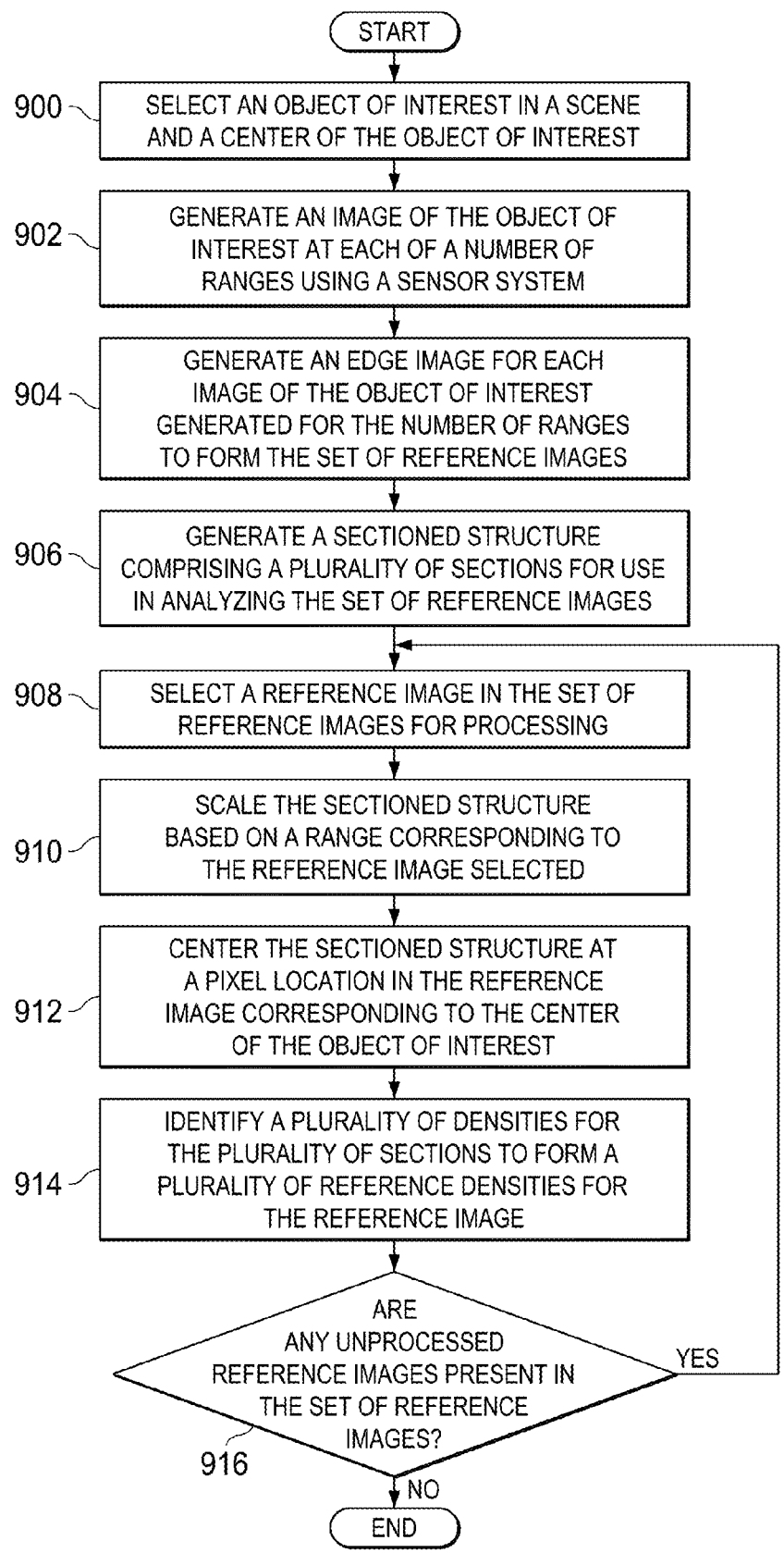
FIG. 9 is an illustration of a process for generating a set of reference images for an object of interest in the form of a flowchart in accordance with an illustrative embodiment.

With reference now to FIG. 9, an illustration of a process for generating a set of reference images for an object of interest is depicted in the form of a flowchart in accordance with an illustrative embodiment. The process illustrated in FIG. 9 may be implemented using the image processor 104 in FIG. 1 or some other computer, processor unit, or data processing system.

The process begins by selecting an object of interest in a scene and a center of the object of interest (operation 900). Next, an image of the object of interest is generated at each of a number of ranges using a sensor system (operation 902). In other words, in operation 902, an image of the object of interest may be generated with the sensor system located at different distances relative to the object of interest.

Then, an edge image is generated for each image of the object of interest generated for the number of ranges to form a set of reference images (operation 904). The edges in an edge image generated for a particular range may form an edge pattern that represents the object of interest at that range.

Thereafter, a sectioned structure comprising a plurality of sections is generated for use in analyzing the set of reference images (operation 906). A reference image in the set of reference images is selected for processing (operation 908). The sectioned structure is scaled based on a range corresponding to the reference image selected (operation 910).

The sectioned structure is then centered at a pixel location in the reference image corresponding to the center of the object of interest (operation 912). A plurality of densities are identified for the plurality of sections to form a plurality of reference densities for the reference image (operation 914). Next, a determination is made as to whether any unprocessed reference images are present in the set of reference images (operation 916). If any unprocessed reference images are present in the set of reference images, the process returns to operation 908 as described above. Otherwise, the process terminates now that a plurality of reference densities have been identified for each of the set of reference images.

Figure 10:
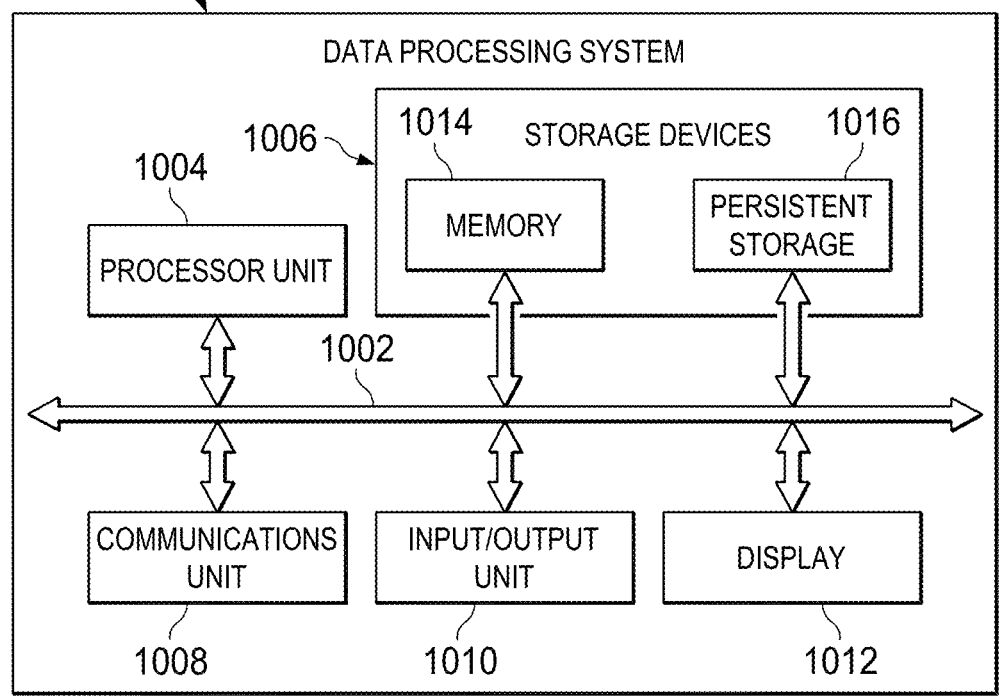
FIG. 10 is an illustration of a data processing environment in the form of a block diagram in accordance with an illustrative embodiment.

Turning now to FIG. 10, an illustration of a data processing system in the form of a block diagram is depicted. In one illustrative embodiment, the data processing system 1000 performs one or more of the operations of the computer system 114.

As depicted, the data processing system 1000 includes a communications framework 1002, which provides communications between a processor unit 1004, storage devices 1006, a communications unit 1008, an input/output unit 1010, and a display 1012. In some cases, the communications framework 1002 may be implemented as a bus system.

The processor unit 1004 is configured to execute instructions for software to perform a number of operations. The processor unit 1004 may comprise a number of processors, a multi-processor core, and/or some other type of processor, depending on the implementation. In some cases, the processor unit 1004 may take the form of a hardware unit, such as a circuit system, an application specific integrated circuit (ASIC), a programmable logic device, or some other suitable type of hardware unit.

In one illustrative example, the processor unit 1004 may be used to perform one or more of the operations performed by the image processor 104. For example, the processor unit 1004 may be used to perform the operations of both the feature detector 116 and the feature analyzer 118 of the image processor 104. In other examples, the processor unit 1004 may perform only the operations of the feature detector 116, while another processor unit in another computer may perform the operations of the feature analyzer 118. In this manner, the operations performed by the image processor 104 may be distributed over multiple processor units in multiple computers.

Instructions for the operating system, applications, and/or programs run by the processor unit 1004 may be located in the storage devices 1006. The storage devices 1006 may be in communication with the processor unit 1004 through the communications framework 1002. A storage device, which may also be referred to as a computer readable storage device, may include any piece of hardware capable of storing information on a temporary and/or permanent basis. This information may include, but is not limited to, data, program code, and/or other information.

The memory 1014 and a persistent storage 1016 are examples of the storage devices 1006. The memory 1014 may take the form of, for example, a random access memory or some type of volatile or non-volatile storage device. The persistent storage 1016 may comprise any number of components or devices. For example, the persistent storage 1016 may comprise a hard drive, a flash memory, a rewritable optical disk, a rewritable magnetic tape, or some combination of the above. The media used by the persistent storage 1016 may or may not be removable.

The communications unit 1008 allows the data processing system 1000 to communicate with other data processing systems and/or devices. The communications unit 1008 may provide communications using physical and/or wireless communications links.

The input/output unit 1010 allows input to be received from and output to be sent to other devices connected to the data processing system 1000. For example, the input/output unit 1010 may allow user input to be received through a keyboard, a mouse, and/or some other type of input device. As another example, the input/output unit 1010 may allow output to be sent to a printer connected to the data processing system 1000.

In one illustrative example, the input/output unit 1010 may be used to allow user input identifying the selected threshold 124 to be used by the feature detector 116. In some cases, the input/output unit 1010 may be used to output the location 156 of the object of interest 105, as identified by the feature analyzer 118, to a printer, the display 1012 of the data processing system 1000, or some other type of output device.

The display 1012 is configured to display information to a user. The display 1012 may comprise, for example, without limitation, a monitor, a touch screen, a laser display, a holographic display, a virtual display device, and/or some other type of display device.

In this illustrative example, the processes of the different illustrative embodiments may be performed by the processor unit 1004 using computer-implemented instructions. These instructions may be referred to as program code, computer usable program code, or computer readable program code and may be read and executed by one or more processors in the processor unit 1004.

In these examples, a program code 1018 is located in a functional form on a computer readable media 1020, which is selectively removable, and may be loaded onto or transferred to the data processing system 1000 for execution by the processor unit 1004. In one illustrative example, the program code 1018 may contain the instructions needed to perform at least one of the operations performed by the image processor 104.

The program code 1018 and the computer readable media 1020 together form a computer program product 1022. The computer program product 1022 may be operable to be loaded on the data processing system 1000.

In this illustrative example, the computer readable media 1020 may be a computer readable storage media 1024 or a computer readable signal media 1026. The computer readable storage media 1024 is a physical or tangible storage device used to store the program code 1018 rather than a medium that propagates or transmits the program code 1018. In one illustrative example, the computer readable storage media 1024 may include a non-transitory computer readable storage medium. The computer readable storage media 1024 may be, for example, without limitation, an optical or magnetic disk or a persistent storage device that is connected to the data processing system 1000.

Alternatively, the program code 1018 may be transferred to the data processing system 1000 using the computer readable signal media 1026. The computer readable signal media 1026 may be, for example, a propagated data signal containing the program code 1018. This data signal may be an electromagnetic signal, an optical signal, and/or some other type of signal that can be transmitted over physical and/or wireless communications links.

The illustration of the data processing system 1000 in FIG. 10 is not meant to provide architectural limitations to the manner in which the illustrative embodiments may be implemented. The different illustrative embodiments may be implemented in a data processing system that includes components in addition to or in place of those illustrated for the data processing system 1000. Further, components shown in FIG. 10 may be varied from the illustrative examples shown.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the illustrative examples described in the figures above provide a method and apparatus for performing isotropic edge detection to identify and locate objects of interest. Although the illustrative examples are described with respect to identifying an object of interest, such as the object of interest 105 described in FIG. 1, in a single image, such as the image 107 described in FIG. 1, the isotropic edge detection may be used to identify an object of interest in each of a sequence of images.

For example, the isotropic edge detection may be used to identify an object of interest in each frame in a video such that the object of interest may be tracked through the video. By using the isotropic edge detection and edge analysis methods described by the different illustrative examples, processing time and resources needed for this process may be reduced. As a result, this process may be useful for real-time applications that involve tracking an object of interest.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for detecting an object of interest, the method comprising:
   generating an edge image from an image of a scene;
   generating a sectioned structure comprising a plurality of sections for use in analyzing the edge image;
   analyzing the edge image using the sectioned structure, wherein analyzing the edge image comprises: identifying a plurality of edge pixel densities representing the number of edge pixels within each of the plurality of sections of the sectioned structure at each of a plurality of pixel locations in the edge image; comparing the plurality of edge pixel densities identified to a plurality of reference densities for a reference image to generate the plurality of variances for the plurality of pixel locations; and detecting a presence of the object of interest in the edge image when at least one pixel location in the plurality of pixel locations has a variance in the plurality of variances that is below a selected threshold.

2. The computer-implemented method of claim 1, wherein the sectioned structure is a concentric structure comprising a series of concentric rings, and wherein using the sectioned structure reduces an amount of processing resources used by a computer system when detecting the object of interest.

3. The computer-implemented method of claim 1, wherein generating the sectioned structure comprises:
 identifying a selected range at which the image of the scene is generated;
 generating the sectioned structure comprising the plurality of sections; and
 scaling the sectioned structure based on the selected range.

4. The computer-implemented method of claim 1, wherein analyzing the edge image using the sectioned structure to detect the presence of the object of interest in the edge image comprises:
 moving the sectioned structure to the plurality of pixel locations over the edge image.

5. The computer-implemented method of claim 4, wherein analyzing the edge image using the sectioned structure to detect the presence of the object of interest in the edge image further comprises:
 identifying the plurality of variances for the plurality of pixel locations using the sectioned structure and the reference image; and
 detecting the presence of the object of interest in the edge image in response to a determination that at least one pixel location in the plurality of pixel locations has a variance in the plurality of variances that is below the selected threshold.

6. The computer-implemented method of claim 5, wherein analyzing the edge image using the sectioned structure to detect the presence of the object of interest in the edge image further comprises:
 selecting the reference image corresponding to a selected range at which the image is generated from a set of reference images in which the reference image contains an edge pattern representing the object of interest at the selected range.

7. The computer-implemented method of claim 5 further comprising:
 identifying a location of the object of interest in the edge image as a pixel location having a minimum variance in the plurality of variances that is below the selected threshold.

8. The computer-implemented method of claim 1 further comprising:
 receiving the image of the scene from a sensor system.

9. A system comprising:
 a feature detector configured to generate an edge image from an image of a scene; and
 a feature analyzer configured to generate a sectioned structure comprising a plurality of sections; identify a plurality of edge pixel densities representing the number of edge pixels within each of the plurality of sections of the sectioned structure at each of a plurality of pixel locations in the edge image; compare the plurality of edge pixel densities identified to a plurality of reference densities for a reference image to generate the plurality of variances for the plurality of pixel locations; and detect a presence of the object of interest in the edge image when at least one pixel location in the plurality of pixel locations has a variance in the plurality of variances that is below a selected threshold.

10. The system of claim 9, wherein the feature analyzer is configured to generate the sectioned structure comprising a series of concentric rings based on a selected range at which the image of the scene is generated.

11. The system of claim 9, wherein the feature analyzer is configured to move the sectioned structure to a plurality of pixel locations over the edge image to analyze the edge image.

12. The system of claim 11, wherein the feature analyzer is configured to identify a plurality of densities for the plurality of sections of the sectioned structure at each pixel location in the plurality of pixel locations.

13. The system of claim 12, wherein the feature analyzer is configured to compare the plurality of densities identified for each of the plurality of pixel locations to a plurality of reference densities identified for a reference image corresponding to a selected range at which the image is generated to generate a plurality of variances for the plurality of pixel locations.

14. The system of claim 13 further comprising:
 a library storing a set of reference images for a set of ranges, wherein the reference image is selected from the set of reference images and wherein the reference image contains an edge pattern representing the object of interest at the selected range.

15. The system of claim 13, wherein the presence of the object of interest in the edge image is detected when at least one of the plurality of pixel locations has a variance below a selected threshold.

16. The system of claim 15, wherein the feature analyzer is configured to identify a location of the object of interest in the edge image as a pixel location having the variance with a minimum value below the selected threshold.

17. The system of claim 9, wherein the sectioned structure is a series of concentric circles that form the plurality of sections.

18. The system of claim 9, wherein the sectioned structure includes a first sectioned wedge having a first portion of the plurality of sections and a second sectioned wedge having a second portion of the plurality of sections.

19. A non-transitory computer readable storage medium storing program code which, when executed by a computer, performs a method on one or more hardware components, the program code comprising:
 program code configured to store a set of reference images in which each reference image in the set of reference images contains an edge pattern representing an object of interest at a particular range;
 program code configured to generate an edge image from an image of a scene generated at a selected range;
 program code configured to form a sectioned structure comprising a plurality of sections
 program code configured to identify a plurality of edge pixel densities representing the number of edge pixels within each of the plurality of sections of the sectioned structure at each of a plurality of pixel locations in the edge image;
 program code configured to compare the plurality of edge pixel densities identified to a plurality of reference densities for a reference image to generate the plurality of variances for the plurality of pixel locations; and
 program code configured to detect a presence of the object of interest in the edge image when at least one pixel location in the plurality of pixel locations has a variance in the plurality of variances that is below a selected threshold.

\* \* \* \* \*